(12) United States Patent
Walter et al.

(10) Patent No.: US 12,315,119 B2
(45) Date of Patent: May 27, 2025

(54) SIGNAL PROCESSING APPARATUS AND METHOD FOR ENHANCING A DIGITAL INPUT SIGNAL

(71) Applicant: LEICA MICROSYSTEMS CMS GMBH, Wetzlar (DE)

(72) Inventors: Kai Walter, Schriesheim (DE); Florian Ziesche, Mannheim (DE)

(73) Assignee: LEICA MICROSYSTEMS CMS GMBH, Wetzlar (DE)

(*) Notice: Subject to any disclaimer, the term of this patent is extended or adjusted under 35 U.S.C. 154(b) by 586 days.

(21) Appl. No.: 17/621,710

(22) PCT Filed: Jun. 19, 2020

(86) PCT No.: PCT/EP2020/067117
§ 371 (c)(1),
(2) Date: Dec. 22, 2021

(87) PCT Pub. No.: WO2020/260152
PCT Pub. Date: Dec. 30, 2020

(65) Prior Publication Data
US 2022/0253983 A1 Aug. 11, 2022

(30) Foreign Application Priority Data
Jun. 24, 2019 (EP) .................................. 19182090

(51) Int. Cl.
*G06T 5/73* (2024.01)
*G02B 7/38* (2021.01)
(Continued)

(52) U.S. Cl.
CPC .................. *G06T 5/73* (2024.01); *G02B 7/38* (2013.01); *G02B 21/12* (2013.01); *G02B 21/244* (2013.01);
(Continued)

(58) Field of Classification Search
CPC .... G06T 5/73; G06T 5/10; G06T 5/20; G06T 5/70; G06T 7/0012; G06T 2207/10056;
(Continued)

(56) References Cited

U.S. PATENT DOCUMENTS 9,456,141 B2* 9/2016 Fishman ................. H04N 23/63
11,854,166 B2* 12/2023 Walter .................. H04N 25/615
(Continued)

OTHER PUBLICATIONS

Rivenson, Yair, et al. "Deep learning microscopy." Optica 4.11 (2017): 1437-1443. (Year: 2017).*
(Continued)

*Primary Examiner* — Andrae S Allison
(74) *Attorney, Agent, or Firm* — LEYDIG, VOIT & MAYER, LTD.

(57) ABSTRACT

A signal processing apparatus for enhancing a digital input signal ($I(x_i)$) recorded by a recording system having a system response ($H(x_i)$), is configured to retrieve the digital input signal ($I(x_i)$) and compute a baseline estimate ($f(x_i)$) of the digital input signal, the baseline estimate representing a baseline of the digital input signal and comprising features of the digital input signal that are larger than a feature length (fl). The apparatus is further configured to remove the baseline estimate from the digital input signal to obtain an output signal comprising spatial features that are smaller than the feature length, retrieve a characteristic length (cl) of the system response ($H(x_i)$) and compute the baseline estimate ($f(x_i)$) using a feature length that is smaller than the characteristic length of the system response ($H(x_i)$).

18 Claims, 7 Drawing Sheets

(51) Int. Cl.
| | |
|---|---|
| G02B 21/12 | (2006.01) |
| G02B 21/24 | (2006.01) |
| G06F 17/13 | (2006.01) |
| G06F 17/15 | (2006.01) |
| G06T 5/10 | (2006.01) |
| G06T 5/20 | (2006.01) |
| G06T 5/70 | (2024.01) |
| G06T 7/00 | (2017.01) |
| G06V 10/30 | (2022.01) |
| H04L 25/02 | (2006.01) |
| H04N 25/615 | (2023.01) |

(52) U.S. Cl.
CPC .............. *G06F 17/13* (2013.01); *G06F 17/15* (2013.01); *G06T 5/10* (2013.01); *G06T 5/20* (2013.01); *G06T 5/70* (2024.01); *G06T 7/0012* (2013.01); *G06V 10/30* (2022.01); *H04L 25/025* (2013.01); *H04N 25/615* (2023.01); *G06T 2207/10056* (2013.01); *G06T 2207/10068* (2013.01); *G06T 2207/20056* (2013.01); *G06T 2207/20081* (2013.01); *G06T 2207/20084* (2013.01); *G06T 2207/20182* (2013.01); *G06T 2207/30024* (2013.01)

(58) Field of Classification Search
CPC . G06T 2207/10068; G06T 2207/20056; G06T 2207/20081; G06T 2207/20084; G06T 2207/30024; G06T 2207/10072; G06T 2207/10132; G02B 7/38; G02B 21/12; G02B 21/244; G06F 17/13; G06F 17/15; G06V 10/30; H04L 25/025; H04N 25/615; H04N 23/675; G03B 13/36; G01S 7/417; G01S 13/89; G01S 15/89; G01V 1/36

See application file for complete search history.

(56) References Cited

U.S. PATENT DOCUMENTS

| | | | | |
|---|---|---|---|---|
| 2005/0288872 | A1* | 12/2005 | Old | G01N 30/72 |
| | | | | 702/30 |
| 2009/0263002 | A1* | 10/2009 | Cremer | G06T 5/20 |
| | | | | 382/133 |
| 2010/0292957 | A1* | 11/2010 | Satulovsky | G06F 17/18 |
| | | | | 702/179 |
| 2013/0222567 | A1 | 8/2013 | Kalkbrenner et al. | |
| 2016/0113587 | A1* | 4/2016 | Kothe | A61B 5/7214 |
| | | | | 600/559 |
| 2017/0061985 | A1* | 3/2017 | Oda | G10L 21/0264 |

OTHER PUBLICATIONS

M. Dai and S. -L. Lian, "Removal of Baseline Wander from Dynamic Electrocardiogram Signals," 2009 2nd International Congress on Image and Signal Processing, Tianjin, China, 2009, pp. 1-4, doi: 10.1109/CISP.2009.5304473. (Year: 2009).*

Idier, J., "Convex Half-Quadratic Criteria and Interacting Auxiliary Variables for Image Restoration," Jul. 2001, IEEE Transactions on Image Processing, 10(7), p. 1001-1009, IEEE, US.

Mazet, V., Carteret, C., Bire, D, Idier, J., and Humbert, B., "Background Removal from Spectra by Designing and Minimizing a Non-Quadratic Cost Function," Chemometrics and Intelligent Laboratory Systems, Elsevier Science Publishers B.V., Amsterdam, NL, vol. 76, No. 2, Apr. 28, 2005 (Apr. 28, 2005), pp. 121-133.

Stephan Preibisch et al.: "Efficient Bayesian-based multiview deconvolution", Nat. Methods, Jun. 2014, 11(6): 645-648, Nature America, Inc., US.

Castello, Diaspro, Vicidomini: "Multi-images deconvolution improves signal-to-noise ratio on gated stimulated depletion microscopy", Applied Physics Letters 105.23: 234106, Dec. 11, 2014, American Institute of Physics, US, pp. 234106-1-234106-4.

Faramarzi et al.: "Unified blind method for multi-image super resolution and single/multi-image blur deconvolution", IEEE Transaction on Signal processing, (22)6, Jun. 2013, IEEE, US, pp. 2101-2114.

Ingaramo et al.: "Richardson-Lucy deconvolution as a general tool for combining images with complementary strengths", Mar. 17, 2014, Wiley online library, US, pp. 1-16.

Harmeling, Sra, Hirsch, Schölkopf: "Multiframe deconvolution, super-resolution, and saturation correction via incremental EM", Proceedings of 2010 IEEE 17th International Conference on Signal processing, Sep. 26-29, 2010, Hong Kong, pp. 3313-3316.

Fish, Brinicombe, Pike: "Blind deconvolution by means of the Richardson-Lucy algorithm", J. Opt. Soc. Am. A. (12) 1, Jan. 1995, pp. 58-65, Optical Society of America, US.

Yim Jonghwa et al.: "Enhancing the Performance of Convolutional Neural Networks on Quality Degraded Datasets", International Conference on Digital Image Computing: Techniques and Applications (DICTA), IEEE, US, Nov. 29, 2017 (Nov. 29, 2017), pp. 1-8, XP033287317.

* cited by examiner

SIGNAL PROCESSING APPARATUS AND METHOD FOR ENHANCING A DIGITAL INPUT SIGNAL

CROSS REFERENCE TO RELATED APPLICATIONS

This application is a U.S. National Phase application under 35 U.S.C. § 371 of International Application No. PCT/EP2020/067117, filed on Jun. 19, 2020, and claims benefit to European Patent Application No. EP 19182090.1, filed on Jun. 24, 2019. The International Application was published in English on Dec. 30, 2020, as WO 2020/260152 A1 under PCT Article 21(2).

FIELD

The invention relates to a signal processing apparatus and method enhancing a digital input signal.

BACKGROUND

When a signal is recorded using a recording system, the non-ideal response of the recording system to a point-like source, as described by its impulse or system response, creates additional noise. This is independent of whether the signal is a time-dependent signal, such as in a radar or sound signal, and/or a location-dependent signal. It also independent from the dimensionality of the signal. Noise is introduced in one-dimensional signals as well as two-dimensional signals, such as images, or multi-dimensional signals, such as three-dimensional data, e.g. as in tomography, or in images that have a plurality of color channels. A lot of effort is undertaken to provide apparatuses and methods that remove any artifacts from the signal.

SUMMARY

In an embodiment, the present disclosure provides a signal processing apparatus for enhancing a digital input signal ($I(x_i)$) recorded by a recording system having a system response ($H(x_i)$). The apparatus is configured to: retrieve the digital input signal ($I(x_i)$); compute a baseline estimate ($f(x_i)$) of the digital input signal, the baseline estimate representing a baseline of the digital input signal and comprising features of the digital input signal that are larger than a feature length (fl); remove the baseline estimate from the digital input signal to obtain an output signal comprising spatial features that are smaller than the feature length; retrieve a characteristic length (cl) of the system response ($H(x_i)$); and compute the baseline estimate ($f(x_i)$) using a feature length that is smaller than the characteristic length of the system response ($H(x_i)$).

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
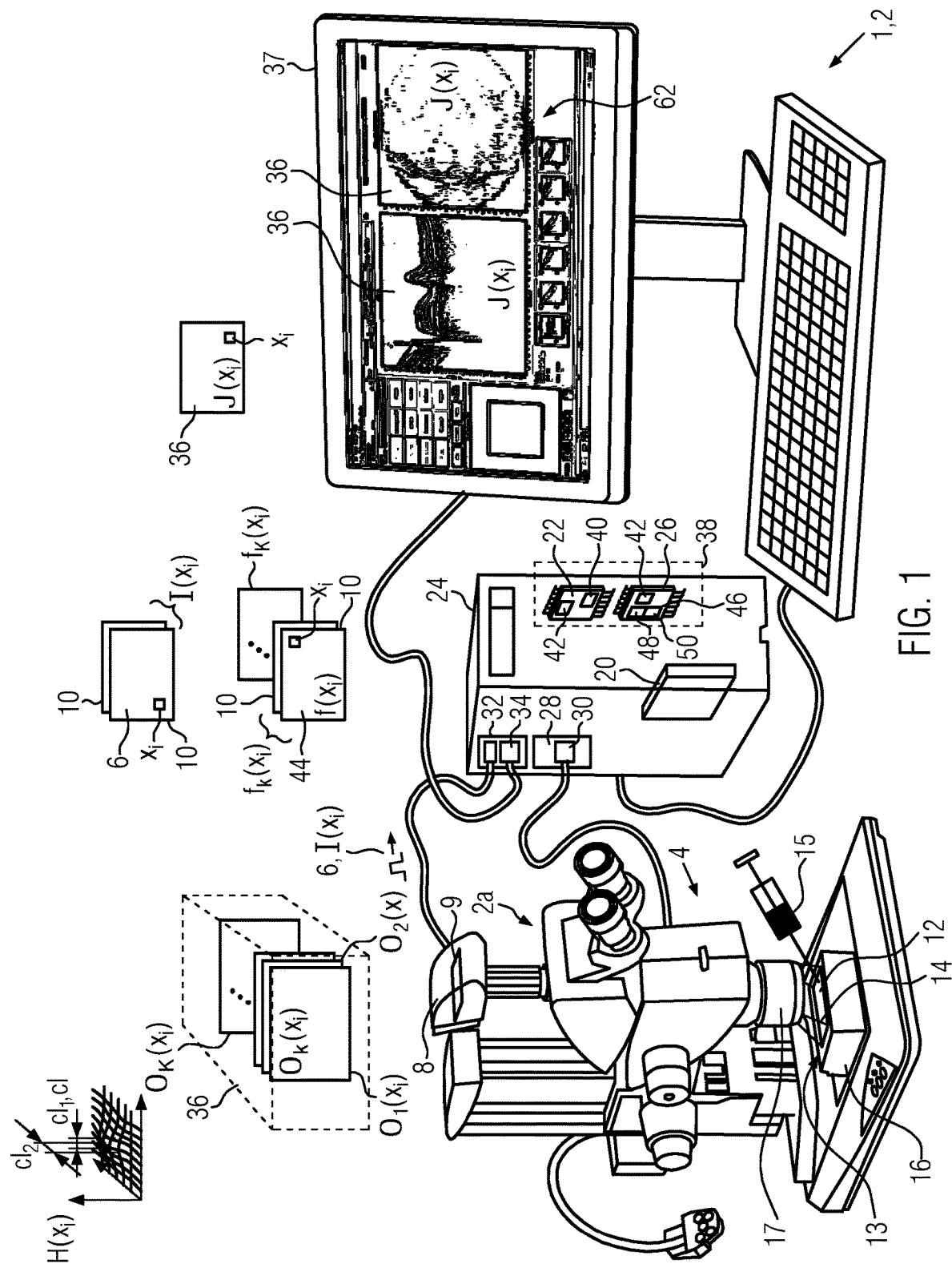
FIG. 1 shows a schematic representation of an embodiment of an apparatus for reducing the noise in an input signal.

Embodiments of the invention provide an apparatus and method which is able to reduce the noise in signals, so that the signal quality is improved.

According to an embodiment, this reduction in the noise in signals and improvement in signal quality is provided by a signal processing apparatus for enhancing a digital input signal recorded by a recording system having a system response, wherein the apparatus is configured to retrieve the digital input signal; compute a baseline estimate of the digital input signal, the baseline estimate representing a baseline and comprising spatial features of the digital input signal that are larger or longer than a feature length; remove the baseline estimate from the digital input signal to obtain an output signal comprising spatial features that are smaller than the feature length; wherein the apparatus is configured to retrieve a characteristic length of the system response; and compute the baseline estimate using a feature length that is smaller than the characteristic length of the system response.

According to another embodiment, this reduction in the noise in signals and improvement in signal quality is provided by a signal processing method for enhancing a digital input signal recorded by a recording system having a system response, the system response having at least one characteristic length in at least one dimension or direction, wherein spatial features are removed from the digital input signal that have a feature length larger or longer than the at least one characteristic length of the system response to obtain an output signal.

In further embodiments, this reduction in the noise in signals and improvement in signal quality is provided by a non-transitory computer readable medium storing a program causing a computer to execute the method according to an embodiment; by a computer program with a program code for performing the method according to an embodiment, when the computer program runs on a processor; by an output signal being the result of executing the method according to an embodiment; and/or by a neural network device trained by input and output signal data, where the output signal data are created from the input signal data by the method according to an embodiment.

Unexpectedly, the noise reduction is improved if the baseline estimate is computed—and subsequently removed—using length scales that are smaller than the characteristic length of the system response, i.e. smaller than the smallest features that can be expected in the input signal. The characteristic length may be expressed in spatial coordinates or in time. For example, when a time signal such as a microphone signal is recorded, the characteristic length of the system response, here an impulse response, may be measured in a time dimension, such as seconds. In a recording system such as an imaging system recording digital images, where the system response is e.g. a point-spread function, the characteristic length may be measured in spatial coordinates.

As a practical example of an input signal, the input signal may contain or consist of one of preferably digital input image data, input sonar, sound and/or ultrasound data, input radar data, input spectroscopy and/or spectral data including cepstra, input microwave data, input vibrational data, such as seismographic data, input tomography data of any kind of tomography and statistical data such as stock exchange data, as well as any combination thereof, all of which may be integer-valued, real-valued arrays of digital data or complex-valued arrays of digital data. The input signal may be one of one-dimensional, two-dimensional, three-dimensional and N-dimensional, where N≥1.

The output signal may contain or consist of one of preferably digital output image data, output sonar, sound or ultrasound data, output radar data, output spectroscopy and/or spectral data including cepstra, output microwave data, output vibrational data, such as seismographic data, and statistical data, such as stock exchange data, as well as any combination thereof. The output signal may be real-valued or integer-valued. The output signal data may be one of one-dimensional, two-dimensional, three-dimensional and N-dimensional. The output signal data may be output for further processing.

In the input signals, a baseline estimate as described herein may be used to remove the artifacts introduced from the system response.

In more general terms, the baseline estimate method described herein may be used not only to remove the baseline estimate from the input signal, but to separate a baseline—noise-component $I_2(x_i)$ from a content component $I_1(x_i)$. These two components may then be processed and, ultimately, analyzed separately. For example, in spectral data, in particular hyperspectral data, large-scale baseline spectral features may be separated from small-scale spectral features and investigated independently.

The term $x_i$ is a shortcut notation for a tuple $\{x_1; \ldots; x_N\}$ containing N location values and representing a discrete location $x_i$—or the position vector to that location—in the array. The location $x_i$ may be represented by a datum or a preferably coherent set of data in the array representing the input signal data. The discrete location $x_i$ denotes e.g. a pair of discrete location variables $\{x_1; x_2\}$ in the case of two-dimensional input signal data and a triplet of discrete location variables $\{x_1; x_2; x_3\}$ in the case of three-dimensional input signal data. In the i-th dimension, the array may contain $M_i$ locations, i.e. $x_i=\{x_{i,1}, \ldots, x_{i,M_i}\}$. In total, $I(x_i)$ may contain $(M_1 \times \ldots \times M_N)$ elements. As, in the following, no reference will be made to a concrete location or a concrete dimension, the location is indicated simply by $x_i$. The notation $x_i$ may represent a spatial and/or a time dimension. A combination of time and spatial dimensions may e.g. be present in a series of image time frames or sequences of input signal data.

$I(x_i)$ can be any value or combination of values at the location $x_i$, such as a value representing an intensity and/or an amplitude of electromagnetic radiation or sound. $I(x_i)$ may represent a color space, e.g. the intensity of the color R in RGB space, or a combined intensity of more than one color, $$\text{e.g. } \frac{R+G+B}{3}$$

e.g. in RGB color space. Input signals that have been recorded as input images by e.g. a multispectral or hyperspectral camera or by a microscope, in particular a scanning microscope, may contain more than three channels. The same is true for other types of input signals.

Two-dimensional input signals or input images in a three-color RGB format may be regarded as three independent sets of two-dimensional input signal data $I(x_i)=\{I_R(x_i); I_G(x_i); I_B(x_i)\}$, where $I_R(x_i)$ represents a value such as the intensity of the color R, $I_G(x_i)$ represents a value such as the intensity of the color G and $I_B(x_i)$ represents a value such as the intensity of the color B. Alternatively, each color may be considered as constituting a separate input signal and thus separate input signal data. If the input signal data have been recorded as input images using a multispectral camera or a hyperspectral camera, more than three channels may be represented by the input signal data. Each channel may represent a different spectrum or spectral range of the light spectrum. For example, more than three channels may be used to represent the visible-light spectrum. If the imaged object contained fluorescent materials, such as at least one fluorophore or at least one auto-fluorescing substance, each channel may represent a different fluorescent spectrum. For example, if a plurality of fluorescing fluorophores is present in the input signal, each fluorescence spectrum of one fluorophore may be represented by a different channel of the input signal. Moreover, different channels may be used for fluorescence which is selectively triggered by illumination on one hand and auto-fluorescence which may be generated as a by-product or as a secondary effect of the triggered fluorescence on the other. Additional channels may cover the NIR and IR ranges. A channel may not necessarily contain intensity data, but may represent other kind of data related to the image of the object, for example, the phase. In another example, a channel may contain fluorescent lifetime data that are representative of the fluorescence lifetime after triggering at a particular location in the image. In general, the input signal data may thus have the form:

$$I(x_i)=\{I_1(x_i); I_2(x_i); \ldots; I_C(x_i)\}$$

where C is the total number of channels in the input signal data. Preferably, all channels have the same dimensionality.

The above apparatus and method may be further improved by adding one or more of the features that are described in the following. Each of the following features may be added to the method and/or the apparatus independently of the other features. In particular, a person skilled in the art is capable to configure the method according to embodiments of the invention such that the method is capable to operate the apparatus according to embodiments of the invention. Moreover, each feature has its own advantageous technical effect, as is explained hereinafter.

In one embodiment, the input signal may be an input image, in particular a digital input image. The output signal may be an output image, in particular a digital output image.

According to one embodiment, the apparatus may be an observation device, in particular a medical observation device such as an endoscope or microscope and the digital input signal may be a digital input image. The apparatus may be configured to capture and/or store at least temporarily the input image; to output the output signal as an output image; to remove, in particular subtract, the baseline estimate from the input signal to compute the output signal; to compute the baseline estimate representing the noise component by a fit to at least a subset of the input signal, using a least-square minimization criterion, which comprises a penalty term.

Further, the method may be a method for—in particular automatically—enhancing or improving the resolution of an input signal, the method comprising the steps of—in particular automatically—estimating a baseline component in the input signal; obtaining a baseline estimate representing a baseline in the image signal; removing, in particular subtracting, the baseline estimate from the input signal to obtain the output signal, wherein the step of estimating the noise component preferably comprises the step of computing the baseline estimate as a fit to at least a subset of the input signal, by minimizing a least-square minimization criterion, and wherein the least-square minimization criterion preferably comprises a penalty term.

For example, it may be assumed that the content component in the input signal, i.e. the component which should be isolated for further processing, have a high spatial or temporal frequency and e.g. are responsible for changes in the input signal which take place over a short distance or time period. The noise components are assumed to have low frequency, i.e. lead to predominantly gradual intensity changes that extend over larger areas of the input signal. Thus, the noise component is reflected in a baseline of the input signal.

Starting from this assumption, the changes across the input signal may be separated additively into a high-frequency content component $I_1(x_i)$ and a low-frequency noise component $I_2(x_i)$ as:

$$I(x_i)=I_1(x_i)+I_2(x_i)$$

Due to its low temporal or spatial frequency, the noise component $I_2(x_i)$ can be considered as a more or less smooth baseline on which the content component $I_1(x_i)$ is superimposed as features of high frequency.

In particular for images, the frequencies to be considered for separating the baseline component from the content component may be spatial frequencies. The same deliberations of course apply if, instead of a spatial frequency, a temporal frequency is considered. In this case, the input signal may e.g. represent a spectrum, cepstrum or a plurality of spectra or cepstra.

The baseline estimate may thus be used equally to extract and/or eliminate either small-scale or large-scale (baseline) signal content in the spatial or frequency domain.

The input signal $I(x_i)$ is recorded with a recording system which is supposed to have a system response $H(x_i)$. The recorded input signal $I(x_i)$ results from the true image $I_T(x_i)$ by a convolution with the system response:

$$I(x_i)=I_T(x_i)*H(x_i)$$

If the recording system is an imaging system, the system response corresponds to a point-spread function of the imaging system. In other systems, such as a system recording a time trace of a signal, e.g. a sound recording system, the system response corresponds to an impulse response.

The system response has a characteristic length cl which may be for example the half-width at half maximum (HWHM), the full-width at half maximum (FWHM), or any other fraction of width and maximum. In the time domain, the characteristic length corresponds to a duration. The system response and/or its characteristic length may be predetermined, i.e. known prior to the apparatus described herein, e.g. by experiments, numerical simulation, analytics or any combination thereof, and be stored in the apparatus. Alternatively or additionally, the system response or its characteristic length may be computed, e.g. by a Lucy-Richardson algorithm.

Once the baseline estimate has been determined and thus a baseline estimate $f(x_i)$ for $I_2(x_i)$ has been obtained, the output signal $O(x_i)$ may be obtained from the baseline estimate and the input signal. In particular, the output signal may be computed by subtracting the baseline estimate from the input signal:

$$O(x_i)=I(x_i)-f(x_i)$$

The output signal $O(x_i)$ is preferably also represented by a discrete digital-data array having dimension N and $M_1 \times \ldots \times M_N$ elements and thus has preferably the same dimensionality as the input signal and/or the baseline estimate. The baseline estimate may also be a hypercube array having N dimensions and $(M_1 \times \ldots \times M_N)$ elements and thus have the same dimensionality as the input signal.

The baseline may be estimated using a fit to the input signal. Computationally, the fit, i.e. the baseline estimate, is represented by the discrete baseline estimate $f(x_i)$.

In one embodiment, the apparatus may be configured to compute a baseline estimate using a regularization length scale, e.g. as described further below. For example, the baseline estimate may be computed using a regularization such as a Tikhonov regularization, in which the regularization length scale may be used as a regularization parameter. The regularization length scale depends preferably solely on the feature length fl.

The apparatus may be configured to compute the baseline estimate using a least-square minimization criterion. The minimization criterion preferably comprises the baseline estimate and the feature length. In particular, a penalty function of the least-square minimization criterion may comprise the feature length.

In another embodiment, the least-square minimization criterion may comprise a preferably dimensionless combination of the feature length and at least one derivative of the baseline estimate. The derivative preferably is a derivative or combination of derivatives with respect to a dimension $x_i$.

In one particular instance, the fit may be a polynomial fit to the input signal. In particular, the baseline estimate may be represented by a K-order polynomial in any of the N dimensions i.

$$f(x_i)=\sum_{k=0}^{K} a_{i,k} x_i^k = a_{i,o} + a_{i,1} x_i^1 + a_{i,2} x_i^2 + \ldots + a_{i,K} x_i^K$$

where $a_{i,k}$ are the coefficients of the polynomial in the i-th dimension. For each dimension $i=1, \ldots, N$, a separate polynomial may be computed. According to one embodiment, the polynomial fit may be done simultaneously in a plurality of dimensions, depending on the dimensions of the input signal.

The optimum value for the maximum polynomial order K depends on the required smoothness of the baseline estimate. For a smooth baseline, the polynomial order must be set as low as possible, whereas fitting a highly irregular background may require a higher order.

In the case of a polynomial fit, the baseline estimation data may consist only of the polynomial coefficients $a_{i,k}$. However, a polynomial fit might be difficult to control and not be precise because the only parameter that allows adjustment to the input signal data is the maximum polynomial order. The polynomial order can only take integer values. It might therefore not always be possible to find an optimum baseline estimate. A non-optimum polynomial fit may exhibit local minima in the baseline estimate, which might lead to annoying artifacts.

Therefore, according to another advantageous embodiment, the fit to the input signal data may be a spline fit, in particular a smoothing spline fit. A spline fit usually delivers more reliable results than a polynomial fit because it is simpler to control, e.g. in terms of smoothness, more robust to noise and creates less artifacts. On the other hand, the spline fit is computationally more complex than the polynomial fit.

For computing the baseline estimate, a least-square minimization criterion is preferably used, which is to be minimized for the fit. The exact formulation of the least-square minimization criterion determines the characteristics of the fit and thus of the baseline estimation data. An improper choice of a least-square minimization criterion may cause the baseline estimate to not represent the noise component with sufficient accuracy.

In order to ensure that the baseline estimation data are an accurate representation of the noise or baseline component in the input signal data and to avoid that the baseline estimate is fitted to the content component, the least-square minimization criterion may comprise a penalty term. The penalty term is used to penalize an unwanted behavior of the baseline estimate, such as representing components of the input signal data which have high frequency content and therefore are thought to belong to the content component.

According to one embodiment, the least-square minimization criterion $M(f(x_i))$ may have the following form:

$$M(f(x_i))=C(f(x_i))+P(f(x_i))$$

where $C(f(x_i))$ is a cost function and $P(f(x_i))$ is the penalty term. The least-square minimization criterion, the cost function and the penalty term are preferably scalar values.

In one particular instance, the cost function represents the difference between the input signal $I(x_i)$ and the baseline estimate $f(x_i)$. For example, if $\varepsilon(x_i)$ denotes the difference term between the input signal and the baseline estimate as:

$$\varepsilon(x_i)=I(x_i)-f(x_i)$$

where the cost function $C(f(x_i))$ may comprise the $L_2$-norm $\|\varepsilon(x_i)\|^2$, which is used here as a short hand notation of the sum of the root-mean-square values across all dimensions of the sum of squared differences between the input signal and the baseline estimate in the i-th dimension, i.e., as follows:

$$\|\varepsilon(x_i)\|^2 = \sum_{i=1}^{N} \sum_{m=1}^{M_i} (I(x_{i,m}) - f(x_{i,m}))^2$$

The $L_2$-norm $\|\varepsilon(x_i)\|^2$ is a scalar value. An example of a cost function is the following quadratic difference term:

$$C(f(x_i))=\|\varepsilon(X)\|^2$$

For improving the accuracy of the baseline estimate, it may be of advantage if the difference between the input signal and the baseline estimate is truncated, e.g. by using a truncated difference term. A truncated difference term reduces the effects of peaks in the input signal data on the baseline estimation data. Such a reduction is beneficial if the content component is assumed to reside in the peaks of $I(x_i)$.

Due to the truncated difference term, peaks in the input signal data that deviate from the baseline estimate more than a predetermined constant threshold value s will be "ignored" in the cost function by truncating their penalty on the fit, in particular the spline fit, to the threshold value. Thus, the baseline estimate will follow such peaks only to a limited amount. The truncated quadratic may be symmetric or asymmetric. The truncated difference term is denoted by $\varphi(\varepsilon(x_j))$ in the following.

In some applications, the content components may be only or at least predominantly contained in the peaks in the input signal, e.g. the bright spots of an image. This may be reflected by choosing a truncated quadratic term which is asymmetric and allows the fit, in particular the spline fit, to follow the valleys but not the peaks in the input signal data. For example, the asymmetric truncated quadratic $\varphi(\varepsilon(x_i))$ may be of the form:

$$\varphi(\varepsilon(x_i)) = \begin{cases} \varepsilon(x_i)^2 & \text{if } \varepsilon(x_i) \leq s \\ s^2 & \text{else} \end{cases}$$

If, in another particular application, valleys, i.e. dark areas or regions having low values in the input signal, are also to be considered as content components, a symmetric truncated quadratic may be used instead of the asymmetric truncated quadratic. For example, the symmetric truncated quadratic may have the following form:

$$\varphi(\varepsilon(x_i)) = \begin{cases} \varepsilon(x_i)^2 & \text{if } \varepsilon(x_i) \leq s \\ s^2 & \text{else} \end{cases}$$

Using a truncated quadratic, the cost function $C(f(x_i))$ preferably may be expressed as:

$$C(f(x_i))=\sum_{i=1}^{N}\sum_{m=1}^{M_i}\varphi(x_{i,m})$$

The penalty term $P(f(x_i))$ in the least-square minimization criterion $M(f(x_i))$ may take any form that introduces a penalty if the baseline estimate is fitted to data that are considered to belong to the content component $I_1(x_i)$. A penalty is created in that the penalty term increases in value if the content component in the input signal is represented in the baseline estimate.

If e.g. one assumes that the noise component $I_2(x_i)$ is considered to have low spatial frequency, the penalty term may comprise a term that becomes large if the spatial frequency of the baseline estimate becomes large.

Such a penalty term may be in one embodiment a roughness penalty term which penalizes non-smooth baseline estimation data that deviate from a smooth baseline and thus effectively penalizes the fitting of data having high spatial frequency.

In particular, the baseline estimate may be computed using penalty term that comprises a feature length fl that is representative for the length scale above which a feature in the input signal is considered noise and below which a feature in the input signal is considered content. For example, if a feature length fl is set to 0.01 mm, all features smaller than 0.01 mm will be considered content and thus be penalized if contained in the baseline estimate. The feature length may be used in a regularization length scale of a regularization, such as a Tikhonov regularization, for computing the baseline estimate.

According to another aspect, a deviation from a smooth baseline may lead to large values in at least one of the first derivative, i.e. the steepness or gradient, and the second derivative, i.e. the curvature, of the baseline estimate. Therefore, the roughness penalty term may contain at least one of a first spatial derivative of the baseline estimate, in particular the square and/or absolute value of the first spatial derivative, and a second derivative of the baseline estimate, in particular the square and/or absolute value of the second spatial derivative. More generally, the penalty term may contain a spatial derivative of any arbitrary order of the baseline estimate, or any linear combination of spatial derivatives of the baseline estimate. Different penalty terms may be used in different dimensions.

In one embodiment, the penalty term $P(f(x_i))$ may comprise a dimensionless combination, e.g. quotient, of a derivative of the baseline estimate $f(x_i)$ with regard to its variable and the feature length fl. Different feature lengths may be used for different dimensions For example, the roughness penalty term $P(f(x_i))$ may be formed as:

$$P(f(x_i)) = \sum_{j=1}^{N} \gamma_j \sum_{i=1}^{N} \sum_{m=1}^{M_i} (\partial_j^2 f(x_{i,m}))^2$$

This roughness penalty term penalizes a large rate of change in the gradient of the baseline estimate or, equivalently, a high curvature, and thus favors smooth estimates. Herein, $\gamma_j$ is a regularization parameter or, synonymously, a regularization length scale and $\partial_j^2$ is a discrete operator for computing the second derivative in the j-th dimension. As the unit of the second derivative is (unit of $x_i$)$^{-2}$, i.e. length$^{-2}$ or time$^{-2}$, the regularization length scale $\gamma_j$ is set to the fourth power of the feature length, $\gamma_j = fl_j^4$, so that the penalty term is scalar.

In a penalty term, which is based on the first-order derivative $\partial_j$, such as:

$$P(f(x_i)) = \sum_{j=1}^{N} \gamma_j \sum_{i=1}^{N} \sum_{m=1}^{M_i} (\partial_j f(x_{i,m}))^2$$

the regularization length scale $\gamma_j$ may be equal to the square of the feature length, $\gamma_j = fl_j^2$, as the unit of the first-order derivative is (unit of $x_i$)$^{-1}$.

For a combination of various derivatives, such as:

$$P(f(x_i)) = \sum_{j=1}^{N} \gamma_j \sum_{i=1}^{N} \sum_{m=1}^{M_i} (\partial_j^2 f(x_{i,m}))^2 + \sum_{j=1}^{N} \gamma_{2,j} \sum_{i=1}^{N} \sum_{m=1}^{M_i} (\partial_j f(x_{i,m}))^2$$

each of the regularization length scale is set in dependence of the respective derivative. In the above example, $\gamma_{1,j} = fl_j^4$, and $\gamma_{2,j} = fl_j^2$.

In a combined derivative, such as $\partial_i \partial_j f(x_{i,j})$, $i \neq j$, a corresponding combination of feature lengths, e.g. $fl_i \cdot fl_j$ may be used.

The regularization length scale $\gamma_j$ depends on the structure of the input signal, i.e. the maximum length scale that is considered to be part of the content component. Structures in the input signal having a length scale that is larger than the feature length as represented by the regularization length scale are considered as belonging to the noise component. The regularization length scale is preferably larger than zero. It is preferred, however, for reaching better resolution that the regularization length scale $\gamma_j$ is chosen such that the feature length fl it represents is smaller than the characteristic length cl of the system response $H(x_i)$, $fl_j < cl_j$, wherein $cl_j$ is the characteristic length of the system response in the direction of dimension j. Even better results in terms of resolution may be obtained if the characteristic length is equal to or smaller than about 40%-50% of the characteristic length of the system response, or equivalently $fl_j \leq 0.4 \ldots 0.5 \, cl_j$. It is to be noted that both the characteristic length and the feature length may be constant in all dimensions.

In the discrete, the differentiation may be computed efficiently using a convolution. For example:

$$\partial_j^2(x_{i,m}) = D_{i,m}^{(j)} * f(x_{i,m})$$

with a second order derivative matrix as follows:

$$D_{i,m}^{(j)} = \begin{cases} 1 & \text{if } m = 1, M_j \text{ and } i = j \\ -2 & \text{if } m = 0 \text{ and } i = j \\ 0 & \text{else} \end{cases}$$

It is preferred, however, that the roughness penalty term $P(f(x_i))$ is formed as:

$$P(f(x_i)) = \sum_{j=1}^{N} \gamma_j \sum_{i=1}^{N} \sum_{m=1}^{M_i} (\partial_j f(x_{i,m}))^2$$

This is a roughness penalty term that penalizes small-scale features and large gradients in the baseline estimate. The sum over j allows to use different penalty terms in different dimensions. It should be noted that, as $x_j$ and $f(x_i)$ are both discrete, the differentiation can be carried out by convolution with a derivative array $\partial_j$. The operator $\partial_j$ represents a discrete first-order derivative or gradient operator in the dimension j, which may be represented by an array.

Instead of or in addition to a derivative or a linear combination of derivatives of the baseline estimate, the penalty term may contain a feature-extracting, in particular linear, filter or a linear combination of such filters. Feature-extracting filters may be a Sobel filter, a Laplace filter, and/or a FIR filter, e.g. a high-pass or band-pass spatial filter having a pass-band for high spatial frequencies.

In such general formulation, the penalty term for the j-th dimension may contain general operators $\zeta^{(j)}$ and be expressed as:

$$P(f(x_i)) = \sum_{j=1}^{N} \gamma_j \sum_{i=1}^{N} \sum_{m=1}^{M_i} [\zeta^{(j)}(f(x_{i,m}))]^2$$

Again, $\gamma_j$ contains the feature length fl for any length scale involved in $\zeta^{(j)}$. In particular, $\gamma_j$ may be a function of the feature length fl, $\gamma_j = g(fl)$. More specifically, the regularization length scale may be a linear, quadratic or, more generally, polynomial function of the feature length.

The least-square minimization criterion $M(f(x_i))$ may be minimized using known methods. In one instance, a preferably iterative quadratic or half-quadratic minimization scheme may be used. For performing the minimization, the baseline estimator engine may comprise a minimization engine. The minimization scheme may comprise an iteration mechanism having two iteration stages.

The minimization scheme may e.g. comprise at least part of the LEGEND algorithm, which is computationally efficient. The LEGEND algorithm is described in Idier, J. (2001): *Convex Half-Quadratic Criteria and Interacting Variables for Image Restoration*, IEEE Transactions on Signal processing, 10(7), p. 1001-1009, and in Mazet, V., Carteret, C., Bire, D, Idier, J., and Humbert, B. (2005): *Background Removal from Spectra by Designing and Minimizing a Non-Quadratic Cost Function*, Chemometrics and Intelligent Laboratory Systems, 76, p. 121-133. Both articles are herewith incorporated by reference in their entirety.

The LEGEND algorithm introduces discrete auxiliary data $d(x_i)$ that are preferably of the same dimensionality as the input signal data. The auxiliary data are updated at each iteration depending on the latest initial baseline estimation data, the truncated quadratic term and the input signal data.

In the LEGEND algorithm, the least-square minimization criterion containing only a cost function and no penalty term is minimized using two iterative steps until a convergence criterion is met.

A suitable convergence criterion may, for example, be that the sum of the differences between the current baseline estimation data and the previous baseline estimation data across all locations $x_i$ is smaller than a predetermined threshold.

In a further improvement, the convergence criterion may be expressed as:

$$\frac{\sum_{i=0}^{N}\sum_{m=0}^{M_i}|f_l(x_{i,m}) - f_{l-1}(x_{i,m})|}{\sum_{i=0}^{N}\sum_{m=0}^{M_i}f_l(x_{i,m}) + f_{l-1}(x_{i,m})} < t$$

where t is a scalar convergence value which may be set by the user.

As a starting step in the LEGEND algorithm, an initial set of baseline estimation data is defined.

The LEGEND algorithm may be started by selecting a starting set of coefficients $a_k$ for a first baseline estimate $f_0(x_i) = \sum_{k=0}^{K} a_{i,k} x_i^k$ for each of the $i=1, \ldots, N$ polynomials if a polynomial fit is used.

If a spline fit is used, the initial condition for starting the LEGEND algorithm may be $d(x_i)=0$, $f(x_i)=I(x_i)$ and the iteration is started by entering at the second iterative step.

In the first iterative step, the auxiliary data may be updated as follows:

$$d_l(x_i) = \begin{cases} (2\alpha - 1)(I(x_i) - f_{l-1}(x_i)) & \text{if } \varepsilon(x_i) \le s \\ -I(x_i) + f_{l-1}(x_i) & \text{else} \end{cases}$$

where $l=1 \ldots L$ is the index of the current iteration and a is a constant that may be chosen. Preferably, $\alpha$ is close but not equal to 0.5. A suitable value of $\alpha$ is 0.493.

In a second iterative step, the baseline estimate $f_l(x_i)$ is updated based on the previously calculated auxiliary data $d_l(x_i)$, the baseline estimate $f_{l-1}(x_i)$ from the previous iteration l-1 and on the penalty term $P(x_i)$.

The baseline estimate $f_l(x_i)$ may be minimizing a minimization criterion $M(f(x_i))$ which has been modified for the LEGEND algorithm by including the auxiliary data.

In particular, the updated baseline estimation data may be computed using the following formula in the second iterative LEGEND step:

$$f_l(x_i) = \underset{f}{\mathrm{argmin}}[\|I(x_i) - f_{l-1}(x_i) + d_l(x_i)\|^2 + P(f(x_i))]$$

Here, $[\|I(x_i) - f_{l-1}(x_i) + d_l(x_i)\|^2 + P(f(x_i))]$ represents the modified minimization criterion.

The second iterative step may update the baseline estimation data using the following matrix computation:

$$f_l(x_i) = (1 + \Sigma_{i=1}^{N} \gamma_i A_i^T A_i)^{-1} (I(x_i) + d(x_i)))$$

Here $(1+\Sigma_{i=1}^{N}\gamma_i A_i^T A_i)$ is a $(M_x \times \ldots \times M_N)^2$ dimensional array. In the two-dimensional case, $A_i$ is a $(M_x-1)(M_y-1) \times M_x M_y$ array and given as:

$$A_i = \begin{pmatrix} \hat{A} & -\hat{A} & \hat{0} & \cdots & \hat{0} \\ \hat{0} & \hat{A} & -\hat{A} & \ddots & \vdots \\ \vdots & \ddots & \ddots & \ddots & \hat{0} \\ \hat{0} & \cdots & \hat{0} & \hat{A} & -\hat{A} \end{pmatrix}$$

with $$\hat{A} = \begin{pmatrix} 1 & -1 & 0 & \cdots & 0 \\ 0 & 1 & -1 & \ddots & \vdots \\ \vdots & \ddots & \ddots & \ddots & 0 \\ 0 & \cdots & 0 & 1 & -1 \end{pmatrix},$$

$$\hat{0} = \begin{pmatrix} 0 & 0 & 0 & \cdots & 0 \\ 0 & 0 & 0 & \ddots & \vdots \\ \vdots & \ddots & \ddots & \ddots & 0 \\ 0 & \cdots & 0 & 0 & 0 \end{pmatrix} \in \mathbb{R}^{(M_x-1) \times M_x}$$

The two iteration steps for updating $d_l(x_i)$ and $f_l(x_i)$ are repeated until the convergence criterion is met.

According to another aspect, the second step of the LEGEND algorithm is modified using a convolution instead of a matrix computation. This greatly reduces the computational effort.

More particularly, it is preferred that the updated baseline estimate $f_l(x_i)$ is computed directly by convolving a Green's function with the sum of the input signal and the updated auxiliary data.

According to a more concrete aspect, the second iterative step of the LEGEND algorithm may be replaced by the following iterative step, where the updated baseline estimation data $f_l(x_i)$ is computed in the l-th iteration using a Green's function $G(x_i)$ as follows:

$$f_l(x_i) = G(x_i) * (I(x_i) + d_l(x_i))$$

This step reduces the computational burden significantly as compared to the traditional LEGEND algorithm.

The reduced computational burden results from the fact that according to the above second iterative step, a convolution is computed. This computation can be efficiently carried out using an FFT algorithm. Moreover, the second iterative step may make full use of an array processor, such as a graphics processing unit or an FPGA due to the FFT algorithm. The computational problem is reduced from $(M_x \times M_y)$ to $M_x \times M_y$ if the input signal data and all other arrays are two-dimensional. For a general N-dimensional case, the computational burden is reduced from $(M_i \times \ldots \times M_N)^2$ dimensional matrix calculations to the computation of a FFT with $(M_i \times \ldots \times M_N)$-dimensional arrays Thus, the removal of the baseline estimate may be carried out very quickly, preferably in real time for two-dimensional input signal data. In a (2k×2k) data array a removal of the baseline estimate may be carried out in 50 ms and less.

In one specific embodiment, the Green's function may have the form:

$$G(x_{i,m}) = F^{-1}\left[\frac{1}{1 - \sum_{j=1}^{N} \gamma_j F[D_{i,m}^{(j)}]}\right]$$

where $F[\ldots]$ is the discrete N-dimensional Fourier transform, $F^{-1}[\ldots]$ is the inverse discrete N-dimensional Fourier transform, $\gamma_j$ is the regularization length scale of the roughness penalty term, $D_{i,m}^{(j)}$ is a discrete penalty array in the i-th dimension at location m, and N is the total number of dimensions. The upper index $D^{(j)}$ indicates that there may be a different penalty array for each dimension j.

Preferably, the discrete penalty array $D_{i,m}^{(j)}$ corresponds to the discrete representation of the functional derivative $$\frac{\delta P^{(j)}(f(x_i))}{\delta f(x_{i,m})}$$

of the penalty term $P_{(j)}(f(x_i))$ that is used for the j-th dimension. As all functions are represented by discrete arrays, the differentiation can be carried out numerically by a convolution:

$$D_{i,m}^{(j)} * P^{(j)}(x_{i,m})$$

where $D_{i,m}^{(j)}$ is the discrete array for computing the functional derivative $$\frac{\delta}{\delta f(x_{i,m})}.$$

A big advantage of the above Green's function is that any form of penalty term $P(f(x_i))$ may benefit from the fast computation of the second iterative step in the minimization engine. Thus, in the embodiment which uses the Green's function, any penalty term for obtaining a good baseline estimate may be used.

For the general formulation of the penalty term:

$$P(f(x_i)) = \sum_{j=1}^{N} \gamma_j \sum_{i=1}^{N} \sum_{m=1}^{M_i} [\zeta^{(j)}(f(x_{i,m}))]^2$$

the array $D_{i,m}^{(j)}$ is defined by:

$$D_{i,m}^{(j)} * P(f(x_{i,m})) = 0.5 \nabla_f \sum_{j=1}^{N} \gamma_j \sum_{i=1}^{N} \sum_{m=1}^{M_i} [\zeta^{(j)}(f(x_{i,m}))]^2$$

where $\zeta^{(j)}$ is a general operator of the penalty term, * denotes the N-dimensional convolution and $\nabla_f$ corresponds to the discrete first-order functional derivative in function $f(x_{i,m})$, which may e.g. represent intensity. This equation can be solved by means of the least squares method.

For example, if the penalty term is:

$$P(f(x_i)) = \sum_{j=1}^{N} \gamma_j \sum_{i=1}^{N} \sum_{m=1}^{M_i} (\partial_j f(x_{i,m}))^2$$

the derivative array in the convolution may be expressed as:

$$D_{i,m}^{(j)} = \begin{cases} 2 \text{ if } m = 0 \text{ and } i = j \\ -1 \text{ if } m = 1 \text{ or } M_i \text{ and } i = j \\ 0 \text{ else} \end{cases}$$

The apparatus may comprise a storage section. The storage section may be configured to store the input signal, at least temporarily.

The apparatus may comprise a signal input section, which may comprise e.g. one or more standard connectors and/or one or more standardized data exchange protocols, such as HDMI, USB, RGB, DVI. The signal input section may be adapted to receive the output signal via the one or more standard connectors and/or one or more data exchange protocols. For example, a storage device and/or a sensor, such as a camera, may be connected to the signal input section.

The apparatus may comprise a signal output section comprising e.g. one or more standard connectors and/or one or more standardized data exchange protocols, such as HDMI, USB, RGB, DVI. The signal output section may be adapted to output the output signal via the one or more standard connectors and/or one or more data exchange protocols. For example, another computer, a network and/or a display may be connected to the signal output section.

The apparatus may further comprise an signal processor, which may be configured to compute the baseline estimate.

The signal processor may comprise a baseline-removal section. The baseline-removal section may be adapted to subtract a baseline component, e.g. the baseline estimate from the input signal to compute the output signal. In some applications, where the content component is assumed to reside in the low-frequency components of the input signal, the baseline estimate represents already the content component. In this case, a removal of the baseline estimate from the input signals not necessary. Rather, the baseline estimate may be output for display or further processing.

The signal processor may comprise a baseline estimation engine. The baseline estimation engine may be configured to compute the baseline estimate by a fit to at least a subset of the input signal. The baseline estimation engine may comprise a discrete representation of the least-square minimization criterion ($M(x_i)$).

The signal processor, the baseline estimation engine, the baseline-removal section and the minimization engine may each be implemented in hardware, in software or as a combination or hardware and software. For example, at least one of the signal processor, the baseline estimator engine, the baseline-removal section and the minimization engine may be at least partly be implemented by a subroutine, a section of a general-purpose processor, such as a CPU, and/or a dedicated processor such as a CPU, GPU, FPGA, vector processor and/or ASIC.

Another way of implementing any of the above embodiments of the apparatus and the method is to train an artificial neural network, e. g. a convolutional neural network, using pairs of input signal data and output signal data, where the output signal data have been generated using an embodiment of the above described method. A neural network device which has been trained this way can be regarded as an implementation of the method which has been used to generate the training pairs of input and output signal data.

According to another aspect, the neural network device may be adapted to generate an output signal $O(x_i)$, in which spatial features that have a feature length fl smaller than the at least one characteristic length of the system response and spatial features that have a feature length fl larger than the at least one characteristic length of the system response and that are contained in the digital input signal are removed.

It is to be noted that the computation and/or removal of the baseline provides best results if the input signal $I(x_i)$ has not been convolved or deconvolved before. The deconvolution provides the best results if the input signal $I(x_i)$ is preprocessed by the inventive baseline removal.

According to one embodiment, the signal processing apparatus is configured to compute more than one, i.e. a plurality, output signals $O_{1...K}(x_i)$ from a single digital input signal $I(x_i)$ using different feature lengths $fl_{1...K}$ and corresponding penalty terms, and to perform a multi-image deconvolution of the plurality of output signals $O_{1...K}(x_i)$ to obtain a deconvolved output signal $J(x_i)$. For each different feature length, a different regularization length scale and thus a different penalty term is obtained. Thus, the baseline estimate will be different for each different feature length $fl_{1...K}$. Each of the different baseline estimates $f_{1...K}(x_i)$ is removed from a separate copy of the input signal to obtain the plurality of output signals: $O_k=I(x_i)-f_k(x_i)$. Herein, K designates the total number of output signals, and thus also the total number of different feature lengths.

Thus, a first output signal $O_1(x_i)$ may be computed using a first feature length $fl_1$ which will result in a first baseline estimate, and a second output signal $O_2(x_i)$ may be computed using a second feature length $fl_2$ different from the first feature length $fl_1$, resulting in a second baseline estimate. Then, a multi-image deconvolution may carried out based on $O_1(x_i)$ and $O_2(x_i)$.

Multi-image deconvolution is a fusion method of images, which reduces shadows and blur caused by scattering of the lightsheet with the sample to be analyzed (see e.g. the publication "Efficient Bayesian-based multiview deconvolution", Stephan Preibisch et al., Nat Methods., 2014 June, 11(6): 645-648). Multi-image deconvolution is further described in Castello, Diaspro, Vicidomini, (2014): "Multi-images deconvolution improves signal-to-noise ratio on gated stimulated depletion microscopy", Applied Physics Letters 105.23: 234106; in Faramarzi, Rajan, Christensen (2013): "Unified blind method for multi-image super resolution and single/multi-image blur deconvolution", IEEE Transaction on Signal processing, (22) 6; Ingaromo, Yoork, Hoogendorn et al. (2014): "Richardson-Lucy deconvolution as a general tool for combining images with complementary strengths", Wiley online library; and Harmeling, Sra, Hirsch, Schönkopf: "Multiframe deconvolution, super-resolution, and saturation correction via incremental EM", Proceedings of 2010 IEEE $17^{th}$ International Conference on Signal processing.

An unexpectedly improvement of input signal resolution may be obtained if the multi-image deconvolution is based on at least one output signal $O(x_i)$, which has been computed with a feature length fl smaller than the characteristic length cl, in particular smaller than 0.4 . . . 0.5 cl, and at least another output signal $O(x_i)$, which has been computed with a feature length fl, equal to or larger than the characteristic length cl.

A further improvement in the resolution may be obtained, if a separate system response $H_{1...K}(x_i)$ is estimated separately for each of the plurality of output signals $O_k(x_i)$ and used in the multi-image deconvolution. Alternatively, the system response of the input signal $I(x_i)$ may be used, if the computational effort is to be kept low. Estimating the system response anew for each of the output signals $O_k(x_i)$ yields better results, however, as the effective system response is modified after baseline removal.

Preferably, the system response is estimated from the output signal $O_k(x_i)$ using a maximum a-posteriori probability (MAP) distribution.

More specifically, the following MAP may be maximized:

$$P(T_k(x_i),H_k(x_i)|O_k(x_i))$$

This is the probability for the unknown properties $T_k(x_i)$, i.e. the ground truth image, and $H_k(x_i)$ for given output signal $O_k(x_i)$, which is used as an input for the multi-image deconvolution. Assuming Poisson probability, the solution of this maximization is an iterative algorithm known as blind Richardson-Lucy deconvolution. This algorithm is described in Fish, Brinicombe, Pike (1995): "Blind deconvolution by means of the Richardson-Lucy algorithm", J. Opt. Soc. Am. A. (12) 1.

Next, an embodiment is further described by way of example only using a sample embodiment, which is also shown in the drawings. In the drawings, the same reference numerals are used for features which correspond to each other with respect to at least one of function and design.

The combination of features shown in the enclosed embodiment is for explanatory purposes only and can be modified. For example, a feature of the embodiment having a technical effect that is not needed for a specific application may be omitted. Likewise, a feature which is not shown to be part of the embodiment may be added if the technical effect associated with this feature is needed for a particular application.

As is clear from above, any type of image data may be used.

First, the structure of an apparatus 1 is explained with reference to FIG. 1. The apparatus 1 may be a medical observation device 2, such as an endoscope or a microscope 2a, or any other device configured to capture high-quality images, such as a device for aerial or astronomical reconnaissance. Just for the purpose of explanation, a microscope 2a is shown as an example of an apparatus 1. For the purpose of the following description of the embodiments, there is no difference between endoscopes or microscopes.

The apparatus 1 may comprise a recording system 4, which is adapted to capture input signal data 6. If the recording system 4 is an imaging system, it may be provided e.g. with a camera 8 which is configured to record digital input images, preferably in digital format. The camera may comprise an image sensor 9. The camera 8 may be a CCD, multispectral or hyperspectral camera which records the input signal data 6 in a plurality of channels 10, wherein each channel 10 preferably represents a different light spectrum range from the infrared to the ultraviolet. The input signal data 6 are also designated as input signal $I(x_i)$ in the following.

Other types of input signal data 6 may of course be recorded with devices or sensors other than a camera, e.g. a point detector—as in the case of a confocal microscope for example—, one or more microphones, vibrational sensors, accelerometers, velocity sensors, antennas, pressure transducers, temperature sensors, capacitive sensors, magnetic sensors, by radiography, by tomography, by ultrasound and any combination thereof.

In the case of a CCD camera recording in RGB color space, for example, three channels 10, e.g. a R-channel, a G-channel and a B-channel, may be provided to represent a visible light input signal of an object 12. In the case of a multi- or hyperspectral camera, a total of more than three channels 10 may be used in at least one of the visible light range, the IR light range, the NTR light range and the ultraviolet light range.

The recording system 4 has a system response $H(x_i)$ which may be known, e.g. from measurements, or which may be estimated using a MAP algorithm such as a Richardson-Lucy algorithm. The system response $H(x_i)$ has a characteristic length, cl, which may also be known and/or may be direction-independent. Alternatively, there may be a different characteristic length $cl_i$ in each different dimension, such as $cl_1$ in the $x_1$ direction and $cl_2$ in the $x_2$ direction, as shown in FIG. 1. The characteristic length may be the HWHM or FWHM length. The variable $x_i$ may designate a spatial or a temporal dimension.

In case of an imaging system as recording system 4, the object 12 is located in a probe volume 13. The probe volume may be configured to receive the object 12 to be inspected by the apparatus 1. In case of an imaging system as recording system, the probe volume is preferably located in a field of view 14 of the imaging system. The object 12 may comprise animate and/or inanimate matter. The object 12 may further comprise one or more fluorescent materials, such as at least one fluorophore 14.

A multispectral or hyperspectral camera may have a channel 10 for each different fluorescence spectrum of the fluorescent materials in the object 12. For example, each fluorophore 14 may be represented by at least one channel 10 which is matched to the fluorescence spectrum triggered by an illumination system 16. Alternatively or additionally, separate channels 10 may be provided for auto-fluorescence spectra or for spectra of secondary fluorescence, which is triggered by fluorescence excited by the illumination system 16, or for lifetime fluorescence data. Of course, the illumination system 16 may also or solely emit white light or any other composition of light without triggering fluorescence in the object 12.

The microscope 2 may be adapted to excite fluorescence e.g. of fluorophores 15 within an object 12 with light having a suitable fluorescence excitation wavelength by the illumination system 16. The illumination system 16 may be arranged opposite the recording system 4 with respect to the probe volume 13 and/or on the same side as the recording system 4.

If the illumination system 16 is arranged on the same side as the recording system 4, its light may be guided through a lens 17, through which also the input signal $I(x_i)$ is acquired. The illumination system 16 may comprise or consist of one or more flexible light guides to direct light onto the object 12 from one or more different directions. A suitable blocking filter (not shown) may be arranged in the light path in front of the camera 8, e.g. to suppress glare. In case of fluorescence, a blocking filter preferably blocks only the illumination wavelength and allows the fluorescent light of the fluorophores 15 in the object 12 to pass to the camera 8.

If the illumination system is arranged opposite the probe volume 13, its light may pass through the probe volume 13.

It is apparent—without limitation to the general—that the input signal data 6 can be captured by any kind of camera or photo detector.

The input signal data 6 are two-dimensional if a single channel 10 is contained in a two-dimensional image. The input signal may have a higher dimensionality than two if more than two channels 10 are comprised and/or if the input signal data 6 represent a three-dimensional array, such as a three-dimensional image. The signal may be one-dimensional if it represents e.g. a time trace or a one dimensional spatial measurement.

Three-dimensional input signal data 6 may be recorded by the apparatus 1 by e.g. using light-field technology, z-stacking in microscopes, images obtained by a SCAPE microscope and/or a three-dimensional reconstruction of images obtained by a SPIM microscope. Other sources for three-dimensional input signal data may be tomography images. In the case of a three-dimensional image, each plane of the three-dimensional input signal data 6 may be considered as a two-dimensional input signal 6. Again, each plane may comprise several channels 10.

Each channel 10 may be regarded as a separate two-dimensional image or signal. Alternatively, a plurality of channels may together be interpreted as a multi-dimensional array.

The input signal data 6 are a digital representation of a discrete real or integer-valued quantity $I(x_i)$, such as an intensity or a phase, where $x_i$ represents a location in the input signal data 6 and I is the quantity at that location which constitutes the input signal. The term $x_i$ is a shortcut notation for a tuple $\{x_1; \ldots; x_N\}$ containing N, N≥1, dimensions and representing a discrete location $x_i$ in the discrete input signal data. A location $x_i$ may be a pixel or a preferably coherent set of pixels in the input signal data. The discrete location $x_i$ denotes e.g. a pair of discrete location variables $\{x_1; x_2\}$ in the case of two-dimensional input signal data and a triplet of discrete location variables $\{x_1; x_2; x_3\}$ in the case of three-dimensional input signal data. In the i-th dimension, the array may contain $M_i$ locations, i.e. $x_i = \{x_{i,1}, \ldots, x_{i,M_i}\}$. In total, $I(x_i)$ may contain $(M_1 \times \ldots \times M_N)$ elements in the case of N dimensions.

The apparatus 1 may further comprise a storage section 20 which is adapted to contain, at least temporarily, the input signal data 6. The storage section 20 may comprise a volatile or non-volatile memory, such as a cache memory of a CPU 22 of a computing device 24, such as a PC, and/or of a GPU 26. The storage section 20 may further comprise RAM, a hard disk drive or an exchangeable storage section, such as a USB stick or an SD card. The storage section 20 may comprise any combination of these types of memory.

For acquiring the input signal data 6, e.g. from the camera 8, a signal input section 28, may be provided. The signal input section 28 may comprise standardized connection means 30, such as standardized data exchange protocols, hardware connectors and/or wireless connections, or any combination thereof. Examples of standardized connectors which may be connected to the camera 8 are HDMI, USB and RJ45 connectors.

The apparatus 1 may further comprise a signal output section, 32 which may comprise standardized connection means 34, such as standardized data exchange protocols, hardware connectors and/or wireless connections, each configured to output output signal data 36 to one or more displays 37. The output signal data 36 have preferably the same dimensionality as the input signal data 6, and are represented by a discrete array of discrete values, forming an output signal $O(x_i)$.

For computing an output signal $O(x_i)$ from the input signal $I(x_i)$, a signal processor 38 may be provided. The signal processor 38 may be at least partly hardware, at least partly software and/or a combination of both hardware and software. For example, the signal processor 38 may comprise at least one of a CPU 22 and a GPU 26 of the computing device 24, as well as sections that have been coded in software and temporarily exist as structural entities in the CPU 22 and/or the GPU 26 as an operational state. The signal processor 38 may also comprise additional hardware such as one or more ASICs which have been specifically designed in carrying out operations required for the apparatus and method.

Figure 12:
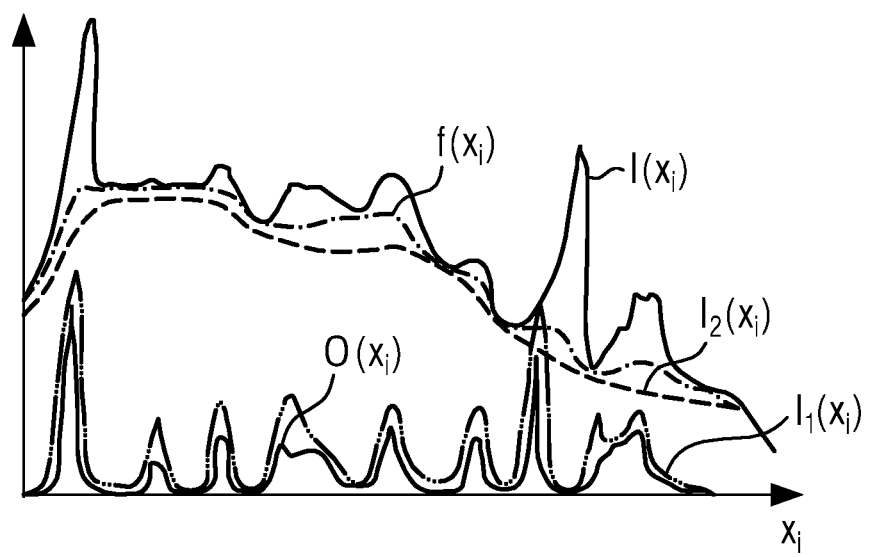
FIG. 12 shows a schematic representation of input signal data, a content component in the input signal data, a noise component in the input signal data, baseline estimation data and output signal data.

Before continuing the further description of FIG. 1, the general principle of enhancing the input signal $I(x_i)$ by estimating and, if necessary, removing a baseline is explained with reference to FIG. 12. For the removal of the baseline, the signal processor 38 may comprise a baseline-removal section 40.

The input signal $I(x_i)$ is assumed to be composed additively from a content component $I_2(x_i)$, which contains content of interest and in particular may correspond to the unknown 'true' input signal, and a noise component $I_1(x_i)$, which contains artifacts and noise that are not part of the true input signal. In the following it is assumed that the noise component $I_2(x_i)$ consists of or comprises predominantly components having low spatial frequency. The noise component thus represents a smooth baseline, about which the content component $I_1(x_i)$ fluctuates at a higher spatial frequency. The noise component $I_2(x_i)$ is assumed to be smooth and as having large length scales; the content component $I_1(x_i)$ is, by contrast, assumed not to be smooth and to contain at least one of peaks and valleys, and to be composed of structures or features having a smaller length scale, or feature length fl, than the noise component. Subtracting the noise component, i.e. the baseline, enhances the image contrast and reduces noise, as shown in FIG. 12. In some situations, however, this situation may be reversed and the content may reside in the large-scale structures and the noise in the small-scale structures. Neither $I_1(x_i)$ nor $I_2(x_i)$ are known and therefore have to be estimated.

For enhancing the input signal, an estimate for the noise component $I_2(x_i)$ is computed. This estimate is represented by a baseline estimate $f(x_i)$, i.e. data that represent an estimate of the baseline. The baseline estimate $f(x_i)$ is a discrete preferably real-valued array that has preferably the same dimensionality as the input signal data 6 and/or the output signal data 36. The baseline estimate $f(x_i)$ is represented by baseline estimation data 44 in FIG. 1. The baseline estimate $f(x_i)$ may also be at least temporarily present in storage section 20. Once the baseline estimate has been computed, the output signal, here represented as $O(x_i)$, is obtained by subtracting the baseline estimate $f(x_i)$ from the input signal $I(x_i)$ at each location $x_i$.

According to FIG. 1, the signal processor 38 may comprise a baseline estimator engine 42, which is configured to compute the baseline estimate $f(x_i)$ by a fit to at least a subset of the input signal data 6. Preferably, the fit to at least the subset of the input signal data is a spline fit.

For a computationally efficient spline fit, the baseline estimator engine 42 may comprise a half-quadratic or quadratic minimization engine 46, which may, for example, be a subroutine or a combination of a hard-wired algorithm and software. The minimization engine 46 may be configured to execute a quadratic or half-quadratic minimization scheme and, towards this end, may comprise two iteration stages 48, 50.

Preferably, the minimization engine 46 uses a convolution to compute the baseline estimation data 44 in the second iteration stage 50. As the convolution can be computed more efficiently on an array processor using a FFT, it is preferred that the signal processor 38 includes an array processor such as a GPU 26. In operation, the signal processor comprises the minimization engine 46.

Figure 2:
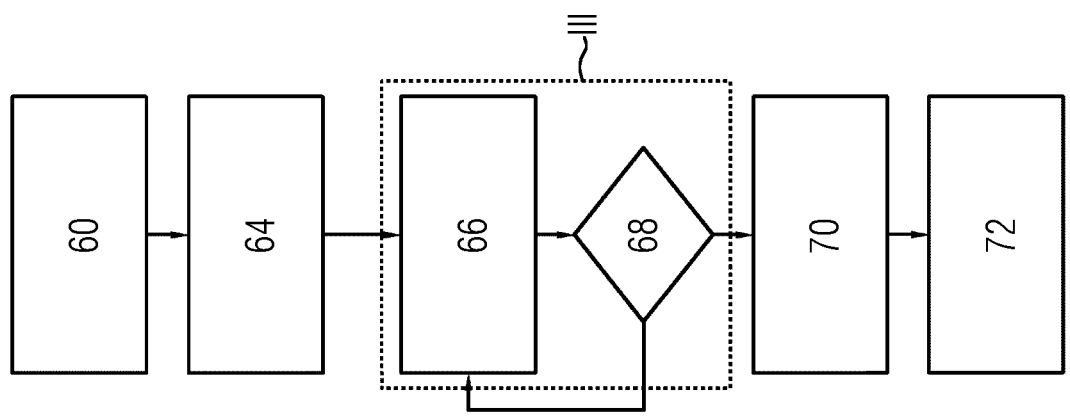
FIG. 2 shows a schematic representation of a flow chart for the baseline removal in an input signal.

With reference to FIG. 2, the steps of computing the output signal $O(x_i)$ from the input signal $I(x_i)$ are described as they are performed by the apparatus 1. It is to be noted that in the case of an input image as input signal, preferably each channel 10 is handled separately.

In a first step 60, various parameters of the baseline estimator engine 42, which need to be preset, may be defined by a user, e.g. using a graphical user interface 62 (FIG. 1). The parameters may comprise the type of fit to the input signal data 6 that is to be performed by the baseline estimator engine 42. For example, a user may choose between a polynomial fit and a spline fit of the baseline estimation data 44 to the input signal data 6. The user may also set a feature length fl which may be used to separate the content component from the noise component.

Further, the user may choose between a variety of penalty terms $P(f(x_i))$ which are used in the minimization scheme. The penalty term determines the shape of the baseline estimate by penalizing the representation of components of the content component $I_1(x_i)$ in the baseline estimate.

For example, the user may be presented with a selection of various penalty terms that penalize non-smooth characteristics of the baseline estimation data 44. For instance, the penalty term may be a high-pass spatial frequency filter for the baseline estimation data 44, which gets larger if the baseline estimation data 44 contain components having high spatial frequency. Other penalty terms may include a gradient of the baseline estimation data 44. Another example of a penalty term may be the curvature of the baseline estimation data 44. Further, feature extracting filters, such as a Sobel, Laplace and/or FIR band-pass, high-pass or low-pass filter may be selected by the user as penalty term. Further, a linear combination of any of the above may be selected. Different penalty terms may be selected for different dimensions or for different channels of the input signal data 6.

The general representation of the penalty term is as follows:

$$P(f(x_i)) = \sum_{j=1}^{N} \gamma_j \sum_{i=1}^{N} \sum_{m=1}^{M_i} [\zeta^{(j)}(f(x_{i,m}))]^2$$

where $\zeta^{(j)}$ is a general operator of the penalty term, which defines the property of the penalty term and $\gamma_j$ is a regularization length scale. The dimension of the regularization length scale is adapted so that the penalty term is scalar. The regularization length scale is a function of the feature length, fl, $\gamma_j = g(fl)$.

In the following, it is assumed that the user selects a gradient-based roughness penalty term based on the gradient of the baseline estimation data $f(x_{i,m})$ or 44 having the following form:

$$P(f(x_i)) = \sum_{j=1}^{N} \gamma_j \sum_{i=1}^{N} \sum_{m=1}^{M_i} (\partial_j f(x_{i,m}))^2 \quad \text{(xi)}$$

This penalty term penalizes large gradients in the baseline estimation data. The operator $\partial_j$ represents a first-order derivative or gradient in the dimension j.

Using the above gradient-based penalty term, the parameters to be specified by the user may further comprise an array $\gamma_j$ of regularization length scales. The regularization length scale represents the length scale, i.e. a feature length $fl_j = \sqrt{\gamma_j}$, below which a structure in the input signal is considered content. Structures in the input signal having a length larger than $\sqrt{\gamma_j}$ are considered noise. As is clear from the index j of $\gamma_j$, the regularization length scale and thus the feature length may be different in each direction. Of course, there may also be used just one direction-independent feature length.

Surprisingly, the resolution of the input signal was improved greatly if the feature length fl used as the or in the regularization length scale in the penalty function is smaller than the characteristic length cl, fl<cl, $fl_i$<$cl_i$.

These results could be further improved if the feature length $f_l$ was set equal to or smaller than half, or smaller than or equal to forty percent of the characteristic length cl of the system response, fl≤0.4 . . . 0.5 cl, $fl_i$≤0.4 . . . 0.5 $cl_i$.

When selecting a parameter for the baseline estimator engine, the user may choose between a symmetric and asymmetric quadratic term $p(E(x_i))$, which also determines the shape of the baseline estimate by specifying the effect of large peaks on the baseline estimation data.

For example, the user may select the following asymmetric, truncated quadratic:

$$\varphi(\varepsilon(x_i)) = \begin{cases} (I(x_i) - f(x_i))^2 & \text{if } \varepsilon(X_i) \leq s \\ s^2 & \text{else} \end{cases}$$

in which s represents a threshold value which is to be input by the user. The threshold value defines a maximum deviation between the input signal data and the baseline estimation data. Peaks above the baseline estimate do not attract the baseline estimate more than a peak which deviates by the threshold value.

Finally, the user may select a convergence criterion and/or a threshold value t which has to be reached by the convergence criterion.

After the initial parameters for the baseline estimator engine 42 have been set, the data are initialized in step 64 for the iterative minimization scheme 66.

From then on, the iterative minimization scheme 66 is carried out by the minimization engine 46 until a convergence criterion 68 is met. In the embodiment, the following convergence criterion is used:

$$\frac{\sum_{i=0}^{N} \sum_{m=0}^{M_i} |f_l(x_{i,m}) - f_{l-1}(x_{i,m})|}{\sum_{i=0}^{N} \sum_{m=0}^{M_i} f_l(x_{i,m}) + f_{l-1}(x_{i,m})} < t$$

where l indicates the current iteration and t is a constant scalar threshold value which may be user-specified.

If the convergence criterion 68 is met, it is assumed that the baseline estimation data 44 have been successfully computed. Thus, the baseline estimation data $f(x_i)$ are subtracted from the input signal data $I(x_i)$ to obtain the output signal data $O(x_i)$ in step 70.

After the computation of the output signal $O(x_i)$ a post-processing operation 72 may be carried out on the output signal data 36, such as a deconvolution.

More particularly, the above computation of the baseline estimate may be carried out at least twice based on the same input signal $I(x_i)$ but using a different feature length fl and thus a different regularization length scale $y_j$ each time. This will result in K different baseline estimates for K different regularization length scales. Each of these K different baseline estimates $f_k(x_i)$ is removed, in particular subtracted, separately from the input signal, so that a plurality of output signals $O_k(x_i)$, wherein k=1 . . . K, is obtained, $O_k(x_i) = I(x_i) - f_k(x_i)$.

In each of the K output signals $O_k(x_i)$, a different regularization length scale, $y_{j,k}$ or, equivalently, feature length $fl_{j,k}$ is represented. At least one output signal is preferably computed with a regularization length scale comprising a feature length fl that is smaller than 40 to 50% of the characteristic length cl and preferably at least one output signal is computed with a regularization length scale having a feature length that is equal to or larger than the characteristic length, fl>cl, $fl_i$>$cl_i$. Deviations of ±20% between the feature length and the characteristic length may still be regarded as equal.

For each of the output signals $O_k(x_i)$, an estimate of the respective modified system response is computed using a MAP algorithm, such as Richardson-Lucy algorithm. Then, a multi-signal or multi-image deconvolution is carried out for the set of output signals $O_k(x_i)$, k=1 . . . K, to obtain deconvolved output signal data 36, representing a deconvolved output signal $J(x_i)$. The deconvolved output signal $J(x_i)$ is a discrete digital real or integer-valued array having preferably the same dimensionality as the input signal $I(x_i)$.

The output signals $O_k(x_i)$ and the deconvolved output signal $J(x_i)$ may be displayed with or without post-processing on the display 37.

Figure 3:
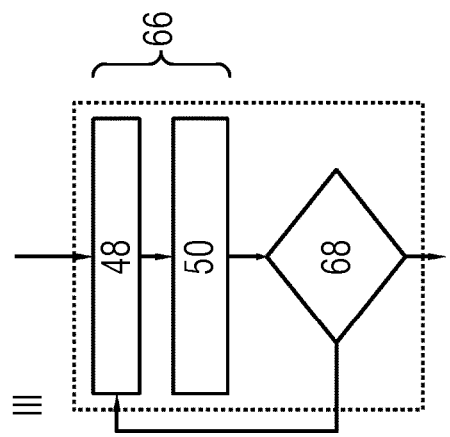
FIG. 3 shows detail III of FIG. 2.

In FIG. 3, detail III of FIG. 2 is shown to explain the minimization scheme 66 in closer detail. The minimization scheme 66 comprises the first iteration stage 48 and the second iteration stage 50.

In principle, the minimization scheme 66 as carried out by the minimization engine 46 may be the LEGEND algorithm. However, it is preferred to modify the second step of the LEGEND algorithm may be modified to significantly reduce the computational burden.

In the shown embodiment, the second iterative stage 50 is entered after initializing the data at step 64. At this point, the first estimate $f_1(x_i)$ of the baseline estimation data is computed by using a convolution of the input signal data with a Green's function $G(x_i)$:

$$f_1(x_i) = G(x_i) * I(x_i)$$

For the gradient-based penalty term used in this embodiment, the Green's function is defined as follows:

$$G(x_{i,m}) = F^{-1}\left[\frac{1}{1 - \sum_{j=1}^{N} \gamma_j F\left[D_{i,m}^{(j)}\right]}\right]$$

where $F[\ldots]$ is the discrete N-dimensional Fourier transform, $F^{-1}[\ldots]$ is the inverse discrete N-dimensional Fourier transform, $\gamma_j$ is the regularization length scale of the roughness penalty term and $D_{i,m}^{(j)}$ is as follows:

$$D_{i,m}^{(j)} = \begin{cases} 2 & \text{if } m = 0 \text{ and } i = j \\ -1 & \text{if } m = 1 \text{ of } M_i \text{ and } i = j \\ 0 & \text{else} \end{cases}$$

Then, in the first iteration stage 48, an updated version of auxiliary data $d_l(x_i)$ may be computed using the current baseline estimation data 44 as follows:

$$d_l(x_i) = \begin{cases} (2\alpha - 1)(I(x_i) - f_{l-1}(x_i)) & \text{if } \varepsilon(x_i) \leq s \\ -I(x_i) + f_{l-1}(x_i) & \text{else} \end{cases}$$

The parameter $\alpha$ is a constant which may have been specified by the user.

Next, in the second iterative stage 50, the updated baseline estimation data 44 are computed using the updated auxiliary data $d_l(x_i)$ of the current iteration l as follows:

$$f_l(x_i) = G(x_i) * (I(x_i) + d_l(x_i))$$

In the next step, it is checked whether the convergence criterion 68 is met. If this is not the case, the minimization scheme 66 proceeds to iterative step 48 using the updated baseline estimation data $f_l(x_i)$.

Figure 4:
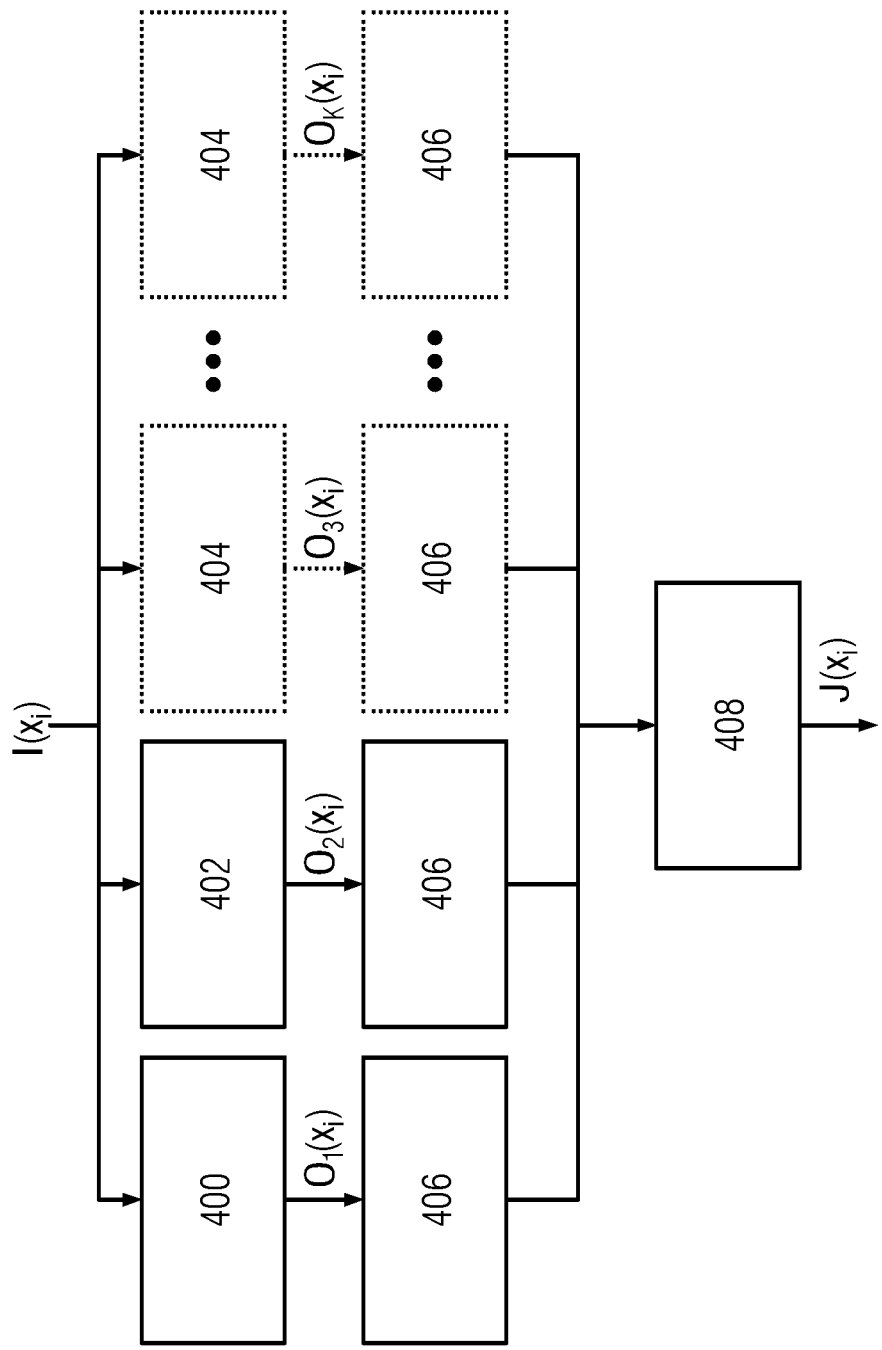
FIG. 4 shows a schematic representation of a method for improving resolution of an input signal.

FIG. 4 shows a sample process flow for obtaining a deconvolved output signal $I(x_i)$ from an input signal $I(x_i)$. In step 400, an output signal $O_1(x_i)$ is computed using a first feature length $fl_{1,i}$ for which preferably $fl_{1,i} < 0.4 \ldots 0.5 \, cl_{1,i}$ holds. In step 402 another output signal $O_2(x_i)$ is computed using a second feature length, $fl_{2,i}$, which is different from the first feature length and for which preferably $fl_{2,i} \geq cl_{2,i}$ holds. In optional step 404, another output signal $O_3(x_i)$ is computed using a feature length that is different from the feature lengths in the other output signals using further different feature lengths. Step 404 may be repeated to obtain more output signal s. The steps that are carried out in steps 400 to 404 correspond to what is explained above with reference to FIGS. 1 to 3.

In step 406, the system response is estimated for each of the output signals $O_k(x_i)$.

In step 408, a multi-image deconvolution is carried out using the plurality of output signals computed in steps 400 to 404 and the estimated system responses of step 406 to obtain a deconvolved output signal $J(x_i)$.

In FIGS. 5 to 9 resolution enhancement by means of the baseline removal is demonstrated for a real image of a Paramecium.

Figure 5:
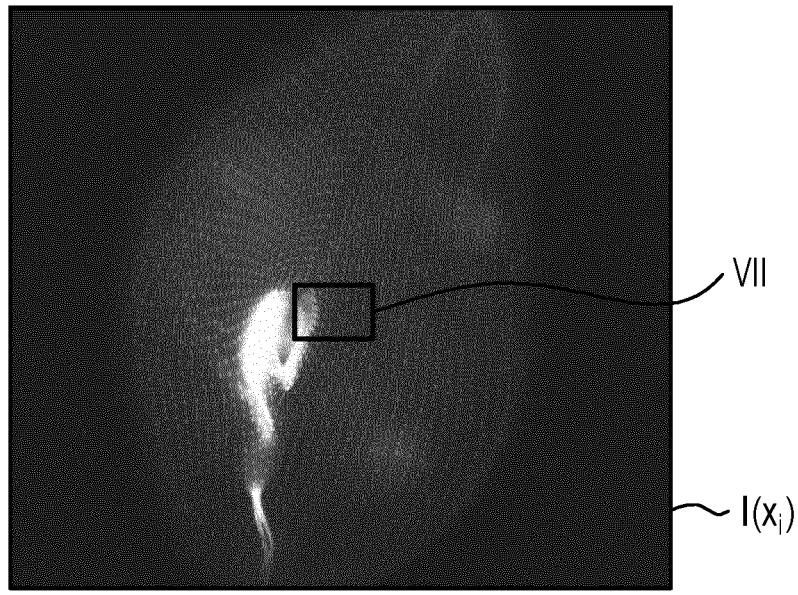
FIG. 5 shows a sample input signal.

FIG. 5 shows the input signal $I(x_i)$, an input image, which was recorded using a DMi8 widefield microscope with a HCX FLUOTAR 100×/1.30 OIL lens at a numerical aperture of 1.3 and a peak emission at 520 nm.

Figure 6:
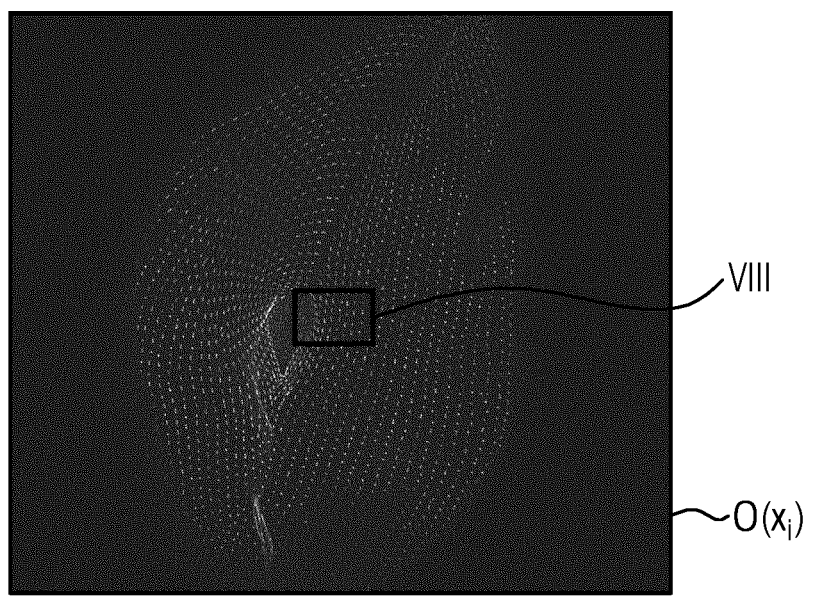
FIG. 6 shows an output signal based on the input signal of FIG. 5.

FIG. 6 shows the output signal $O(x_i)$, an output image, where a feature length fl of 80 nm, i.e. of fl=0.4cl has been used in the regularization length scale in a penalty term comprising the square of the first-order derivative of the baseline estimate as indicated above. The improvement in the resolution enhancement is clearly visible.

Figure 7:
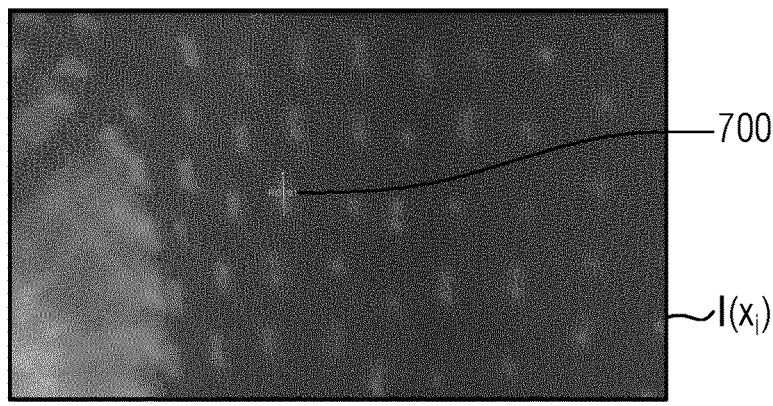
FIG. 7 shows a detail VII of FIG. 5
Figure 8:
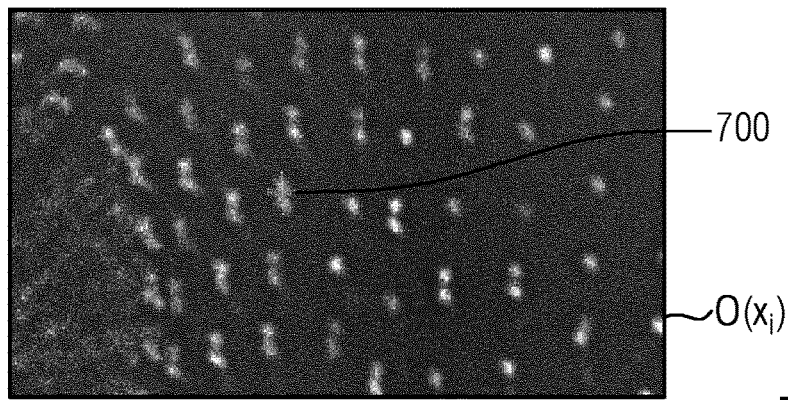
FIG. 8 shows a detail VIII of FIG. 6.

FIGS. 7 and 8 show details VII and VIII of FIGS. 5 and 6 respectively. It can be seen that a significant part of the noise component $I_2(x_i)$, here seen as blur, has been removed in the output signal.

Figure 9:
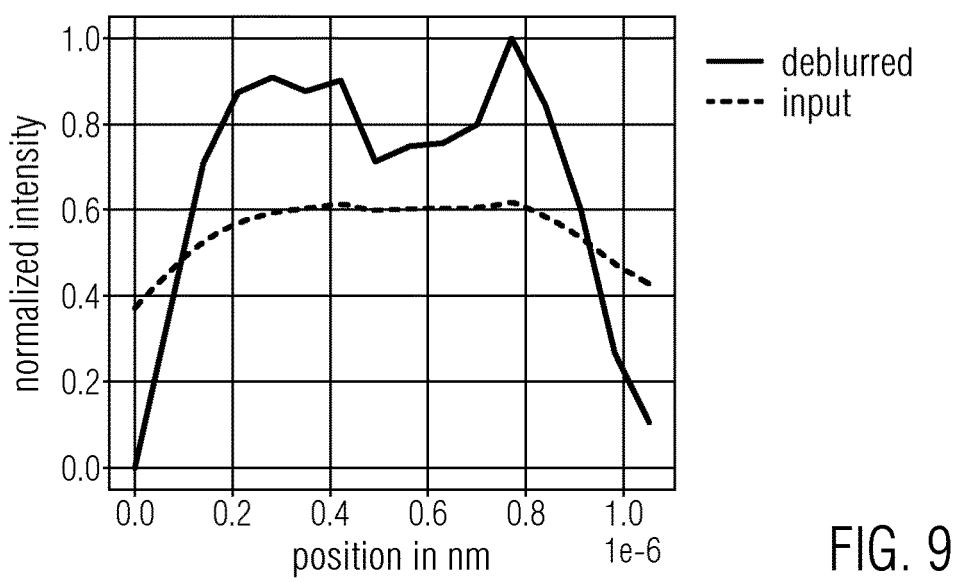
FIG. 9 shows an intensity distribution along a section of FIGS. 7 and 8.

This is verified by FIG. 9, which shows the intensity distributions along a line 700 in FIGS. 7 and 8, respectively. It can be seen that by removing the baseline estimate $f(x_i)$, intensity peaks representing content are maintained and better visible in the output signal $O(x_i)$.

Figure 10:
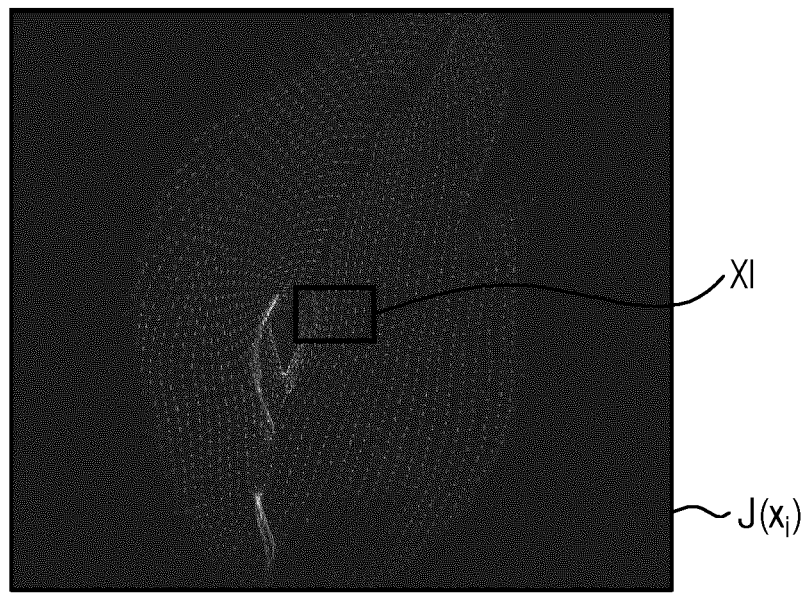
FIG. 10 shows a deconvolved output signal based on a multi-image deconvolution based on the input signal of FIG. 5.
Figure 11:
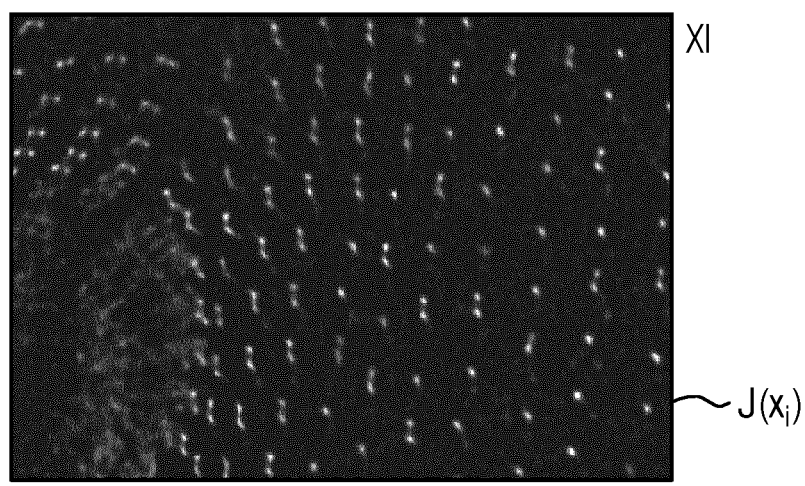
FIG. 11 shows a detail XI of FIG. 10.

FIG. 10 shows the result of a multi-image deconvolution in which the output signal $O(x_i)$ as shown in FIG. 6 was used as a first input. As a second input to the multi-image deconvolution, a second output signal was computed with a feature length corresponding to the characteristic length of the system response, fl=cl. Then, a multi-image deconvolution was performed on these to images was performed as described above to obtain a deconvolved output signal $J(x_i)$. The result obtained is improved in that the signal-to-noise ratio is not reduced as dramatically as by using an output signal with a small feature length. This can be seen in FIG. 11, which shows detail XI of FIG. 10.

As a general note for the application of the removal of the baseline and the multi-image deconvolution, the dimensionality of the data may be changed by rearranging arrays. For example, two-dimensional data may be rendered as one or more sets of one-dimensional data. This may be achieved by stringing subsequent rows or columns behind one another. Further, three-dimensional data may be reduced to two-dimensional data, by stringing subsequent planes one behind each other. By using this principle recursively, any N-dimensional data may be reduced to one or two-dimensional data to which the scheme described above may be applied.

Vice versa, any one-dimensional array may be arranged as a two or higher dimensional array by simply braking it up in smaller one-dimensional array and index those smaller arrays, which preferably have the same length, in a two or higher dimensional scheme. Further, any type of data may be regarded and displayed as image data or as an image, e.g. by assigning a greyscale intensity to each value of the input signal data and displaying it in a two or three-dimensional arrangement, as described above.

As used herein the term "and/or" includes any and all combinations of one or more of the associated listed items and may be abbreviated as "/".

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a processor, a microprocessor, a programmable computer or an electronic circuit. In some embodiments, some one or more of the most important method steps may be executed by such an apparatus.

Depending on certain implementation requirements, embodiments of the invention can be implemented in hardware or in software. The implementation can be performed using a non-transitory storage medium such as a digital storage medium, for example a floppy disc, a DVD, a Blu-Ray, a CD, a ROM, a PROM, and EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may, for example, be stored on a machine readable carrier.

Other embodiments comprise the computer program for performing one of the methods de-scribed herein, stored on a machine readable carrier.

In other words, an embodiment of the present invention is, therefore, a computer program having a program code for performing one of the methods described herein, when the computer program runs on a computer.

A further embodiment of the present invention is, therefore, a storage medium (or a data carrier, or a computer-readable medium) comprising, stored thereon, the computer program for performing one of the methods described herein when it is performed by a processor. The data carrier, the digital storage medium or the recorded medium are typically tangible and/or non-transitionary. A further embodiment of the present invention is an apparatus as described herein comprising a processor and the storage medium.

A further embodiment of the invention is, therefore, a data stream or a sequence of signals representing the computer program for performing one of the methods described herein. The data stream or the sequence of signals may, for example, be configured to be transferred via a data communication connection, for example, via the internet.

A further embodiment comprises a processing means, for example, a computer or a programmable logic device, configured to, or adapted to, perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example, a field programmable gate array) may be used to perform some or all of the functionalities of the methods described herein. In some embodiments, a field programmable gate array may cooperate with a micro-processor in order to perform one of the methods described herein. Generally, the methods are preferably performed by any hardware apparatus.

While subject matter of the present disclosure has been illustrated and described in detail in the drawings and foregoing description, such illustration and description are to be considered illustrative or exemplary and not restrictive.

Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE NUMERALS 1 apparatus
2 observation device
2a microscope
4 recording system
6 input signal data $I(x_i)$
8 camera
9 image sensor
10 channel
12 object
13 probe volume
14 field of view
15 fluorophore
16 illumination system
17 objective
20 storage section
22 CPU
24 computing device
26 GPU
28 signal input section
30 connection means of signal input section
32 signal output section
34 connection means of signal output section
36 output signal data $O(x_i)$
37 display
38 signal processor
40 baseline-removal section
42 baseline estimator engine
44 baseline estimate $f(x_i)$
46 quadratic or half-quadratic minimization engine
48 first iteration stage
50 second iteration stage
60 setup of baseline estimate parameters
62 graphical user interface
64 initializing of minimization engine and/or scheme
66 quadratic or half-quadratic minimization scheme
68 convergence criterion
70 computation of output signal data
72 post-processing operation 400-404 deblurring
406 estimating the system response
408 multi-image deconvolution
700 line

The invention claimed is:

1. A signal processing apparatus for enhancing a digital input signal ($I(x_i)$) recorded by a recording system that records digital images having a system response ($H(x_i)$), the apparatus being configured to:
   input a digital image recorded by the recording system represented by the digital input signal ($I(x_i)$);
   retrieve a characteristic length (cl) of the system response ($H(x_i)$); and
   compute a baseline estimate ($f(x_i)$) of the digital input signal, the baseline estimate ($f(x_i)$) representing a baseline of the digital input signal and comprising features of the digital input signal that are larger than a feature length (fl), wherein the baseline estimate ($f(x_i)$) is computed using a feature length that is smaller than the characteristic length (cl) of the system response ($H(x_i)$);
   remove the baseline estimate from the digital input signal to obtain an output signal comprising spatial features that are smaller than the feature length; and
   output the digital image represented by the output signal in which artifacts generated by the system response are removed from the digital image.

2. The signal processing apparatus according to claim 1, wherein the apparatus is configured to:
   compute a plurality of output signals ($O_{1...K}(x_i)$) from the digital input signal ($I(x_i)$);
   compute each of the plurality of output signals based on a baseline estimate ($f(x_i)$) having a different feature length (fl);
   estimate a system response ($H(x_i)$) for each of the plurality of output signals ($O_{1...K}(x_i)$); and
   perform a multi-image deconvolution of the plurality of output signals ($O_{1...K}(x_i)$) to obtain a deconvolved output signal ($J(x_i)$).

3. The signal processing apparatus according to claim 2, wherein a subset of the plurality of output signals ($O_{1...K}(x_i)$) is based on a feature length (fl) which is larger than the characteristic length of the system response ($H(x_i)$).

4. The signal processing apparatus according to claim 2, wherein a subset of the plurality of output signals ($O_{1...K}(x_i)$) is based on a feature length (fl) which is equal to the characteristic length (cl) of the system response ($H(x_i)$).

5. The signal processing apparatus according to claim 1, wherein the apparatus is configured to apply a different feature length (fl) in at least two of the dimensions of the digital input signal (6, $I(x_i)$).

6. The signal processing apparatus according to claim 1, wherein the characteristic length (cl) of the system response ($H(x_i)$) is different in at least two dimensions (i) of the digital input signal ($I(x_i)$).

7. The signal processing apparatus according to claim 1, wherein the feature length (fl) is comprised in a least-square minimization criterion ($M(f(x_i))$) containing the baseline estimate.

8. The signal processing apparatus according to claim 7, wherein the least-square minimization criterion ($M(f(x_i))$) comprises a penalty function ($P(f(x_i))$), the penalty function comprising the feature length (fl).

9. The signal processing apparatus according to claim 7, wherein the least-square minimization criterion ($M(f(x_i))$) comprises a combination of the feature length (fl) and at least one derivative ($\partial_i, \partial_i^2$) of the baseline estimate ($f(x_i)$).

10. The signal processing apparatus according to claim 1, wherein the feature length (fl) is comprised in a regularization length scale ($\gamma_j$).

11. The signal processing apparatus according to claim 1, wherein the apparatus is configured to carry out a quadratic minimization scheme having two iteration stages.

12. An observation apparatus comprising the signal processing apparatus according to claim 1.

13. A signal processing method for enhancing a digital input signal ($I(x_i)$) recorded by a recording system having a system response ($H(x_i)$), the system response ($H(x_i)$) having at least one characteristic length (cl) in at least one dimension (i), the signal processing method comprising:
   inputting a digital image recorded by the recording system represented by the digital input signal ($I(x_i)$);
   removing spatial features from the digital input signal ($I(x_i)$) that have a feature length (fl) larger than the at least one characteristic length of the system response ($H(x_i)$) to obtain an output signal ($O(x_i)$); and
   outputting the digital image represented by the output signal in which artifacts generated by the system response are removed from the digital image.

14. The signal processing method according to claim 13, wherein at least one further output signal ($O_2(x_i)$) is computed, and wherein computing the at least one further output signal comprises the step of removing spatial features from the digital input signal that have a feature length (fl) that is one of equal to and larger than the at least one characteristic length (cl) of the system response ($H(x_i)$), and wherein a multi-image deconvolution is computed from the output signal ($O(x_i)$) and the at least one further output signal ($O_2(x_i)$) to obtain a deconvolved output signal ($J(x_i)$).

15. The signal processing method according to claim 13, wherein a baseline estimate ($f(x_i)$) is computed using a regularization length scale ($\gamma_j$) depending on the feature length (fl).

16. A tangible, non-transitory computer-readable medium having instructions thereon, which, upon being executed by one or more processors, provides for execution of the method according to claim 13.

17. The digital image stored on a triangle, non-transitory computer-readable medium by output signal ($O(x_i)$) that is a result of the method according to claim 13.

18. A neural network device for enhancing a digital input signal ($I(x_i)$) recorded by a recording system having a system response ($H(x_i)$), the system response ($H(x_i)$) having at least one characteristic length (cl) in at least one dimension (i), the neural network device being configured to:
   input a digital image recorded by the recording system represented by the digital input signal ($I(x_i)$);
   generate an output signal, in which spatial features that have a feature length (fl) smaller than the at least one characteristic length of the system response ($H(x_i)$) and spatial features that have a feature length larger than the at least one characteristic length of the system response ($H(x_i)$) and that are contained in the digital input signal are removed, wherein the feature (fl) is smaller than half the characteristic length (cl) of the system response ($H(x_i)$); and
   outputting the digital image represented by the output signal in which artifacts generated by the system response are removed from the digital image.

* * * * *